United States Patent Office 3,322,713
Patented May 30, 1967

3,322,713
DISPERSION OF PIGMENTS USING SALTS OF ALKYL ESTERS OF OLEFIN-MALEIC ANHYDRIDE COPOLYMERS
Charles R. Williams, Longmeadow, Mass., assignor to Monsanto Company, St. Louis, Mo., a corporation of Delaware
No Drawing. Filed June 4, 1964, Ser. No. 372,708
6 Claims. (Cl. 260—29.6)

This invention relates to an improved method of dispersing organic pigments in liquid systems and in particular aqueous systems.

This application is a continuation-in-part of my copending application Ser. No. 79,115, filed Dec. 29, 1960, now patent number 3,236,797.

The dispersing of organic pigments in either an aqueous medium or a liquid organic medium has always presented the problem of obtaining an effective and a stable dispersion of the organic pigment. This problem exists because of the complex structure of organic pigments and because of their generally high molecular weights. A satisfactory dispersion of these pigments is necessary in order to prevent settling and caking of the pigment, particularly while the dispersion is being stored or shipped. Further, effective and stable dispersions of organic pigments are of particular importance when coating compositions are employed in the recently popular household pressure type spray containers. In some of these coating compositions, complex organic pigments are dispersed in an organic medium. Settling or caking of such a pigment would be extremely detrimental to the proper operation of these spray containers.

An effective and stable dispersion of an organic pigment in water is also desired because of the many advantages resulting therefrom. Some of these advantages are ease of cleanability during use, reduction in potential fire hazard, ease of handling and use, and reduction in cost of manufacturing. For example, the new outdoor latex surface coating compositions employ an aqueous medium, and these compositions definitely offer the above advantages as well as rapid drying. However, it is difficult to prepare effective dispersions of an organic pigment in such aqueous media.

Therefore, the obtaining of effective and stable dispersions of organic pigments, either in an aqueous medium or in an organic medium, by employing an organic dispersing agent therein is of extreme importance to the industry.

Thus, it is an object of this invention to provide an improved process for preparing aqueous dispersions of organic pigments.

Still a further object of this invention is to provide improved aqueous surface coating compositions which include an organic pigment.

Briefly, according to this invention, the foregoing and other objects are attained by incorporating with an organic pigment in a liquid medium an alkali metal, an ammonium or a substituted ammonium salt of an alkyl ester of an olefin-maleic anhydride copolymer, which is an effective dispersing agent for the organic pigments.

The following examples are set forth to more clearly illustrate this invention and are not intended to limit the scope thereof. Unless otherwise indicated, all parts are parts by weight.

*Example I*

To an ethylene-maleic anhydride copolymer having a molecular weight of about 1500, add a quantity of butyl alcohol in excess of a stoichiometrically equivalent portion thereof and form a slurry. This molecular weight and all subsequent molecular weights set forth herein are determined by the specific viscosity of a 1% solution of the particular maleic anhydride copolymer in dimethyl formamide. Heat the slurry to the boiling point of butyl alcohol and reflux until a clear solution is formed. Cool the solution to room temperature. Recover by precipitation in hexane. Dissolve the precipitate formed therefrom in a sodium hydroxide solution to form a 25% solids solution of the sodium salt of the half butyl ester of an ethylene-maleic anhydride copolymer having a pH of 9–10. This solution is subsequently identified as A.

*Example II*

Example I is repeated with the exception of propyl alcohol being employed therein in place of butyl alcohol. The resulting solution contains the sodium salt of the half propyl ester of an ethylene-maleic anhydride copolymer and is subsequently identified as B.

*Example III*

Example I is repeated with the exception of octyl alcohol being employed therein in place of butyl alcohol. The resulting solution contains the sodium salt of the half octyl ester of the ethylene-maleic anhydride copolymer and is subsequently identified as C.

*Example IV*

Example I is repeated with the exception of ammonium hydroxide being employed therein in place of sodium hydroxide and a propylene-maleic anhydride copolymer, having a molecular weight of about 1500 being employed therein in place of the ethylene-maleic copolymer. The resulting solution contains the ammonium salt of the half butyl ester of the propylene-maleic anhydride copolymer and is subsequently identified as D.

*Example V*

Example I is repeated with the exception of an isobutylene-maleic anhydride copolymer, having a molecular weight of about 1500, being employed therein in place of the ethylene-maleic anhydride copolymer. The resulting solution contains the sodium salt of the half butyl ester of the isobutylene-maleic anhydride copolymer and is subsequently identified as E.

*Example VI*

Example I is repeated with the exception of ethanolamine being employed therein in place of the sodium hydroxide. The resulting solution contains the hydroxylethyl ammonium salt of the half butyl ester of the ethylene-maleic anhydride copolymer and is subsequently identified as F.

*Example VII*

The purpose of this example is to illustrate the dispersing action of the solutions prepared in Examples I–VI on organic pigments by using each dispersant separately with separate samples of organic pigments; namely, Phthalocyanine Blue (Monastral Blue) and Toluidine Red (C. P. Toner A–2900). Each pigment sample contains 40% by weight of the individual organic pigment in water. Dispersing action is determined by measuring the viscosity of each sample at 25° C. and a viscosity reading above 1000 centipoises is considered as unsatisfactory.

A 25% solids aqueous solution of the sodium salt of a hydrolyzed ethylene-maleic anhydride copolymer having a molecular weight of about 1500 is prepared as a control. This control solution has a pH of about 9-10. The results are as follows:

| Dispersant | Phthalocyanine Blue | | Toluidine Red | |
| --- | --- | --- | --- | --- |
| | Percent Dispersant* | Viscosity (c.p.s.) | Percent Dispersant* | Viscosity (c.p.s.) |
| A | 1.7 | 300 | 4.3 | 440 |
| B | 1.8 | 380 | 4.8 | 600 |
| C | 2.1 | 420 | 5.2 | 700 |
| D | 1.7 | 300 | 4.5 | 470 |
| E | 2.1 | 400 | 4.5 | 440 |
| F | 2.0 | 330 | 4.8 | 450 |
| Control | 2.0 | >1,000 | 2.0 | >1,000 |
| Do | 4.0 | >1,000 | 4.0 | >1,000 |
| Do | 7.0 | >1,000 | 7.0 | >1,000 |

*Percent Dispersant solids based on weight of organic pigment solids employed therein.

With the exception of the controls, all of the samples were satisfactory dispersions.

*Example VIII*

This example is set forth to illustrate the storage stability of an aqueous latex surface coating composition employing the dispersant described in Example I. A coating composition containing 200 parts of water, 50 parts of Phthalocyanine Blue (Monastral Blue), 1 part of the sodium salt of the half butyl ester of the ethylene-maleic anhydride copolymer, and 120 parts of a styrene-butadiene copolymer is prepared and then allowed to stand at room temperature for 6 months. After 6 months the composition is still a satisfactory dispersion showing little or no settling of the organic pigment and having essentially the same viscosity as originally prepared.

The novelty of this invention is found in the use of certain specified salts of alkyl esters of an olefin-maleic anhydride copolymer as a dispersing agent in the process of preparing dispersions of organic pigments. The quantity necessary to produce a stable and an effective dispersion is 0.1-7.0 weight percent based on the weight of the organic pigment employed.

One embodiment of this invention is the preparation of an aqueous dispersion of an organic pigment. This embodiment comprises incorporating in the aqueous pigment dispersion an alkali metal, an ammonium or a substituted ammonium salt of an alkyl ester of an olefin-maleic anhydride copolymer, which salt of the alkyl ester of the olefin-maleic anhydride copolymer has in its structure recurring groups of the formulae:

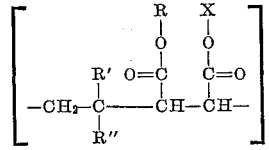

(A)

and

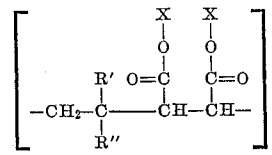

(B)

wherein the groups of Formula A constitute 50-100% and preferably 80-100% of the total of groups (A) and (B). In the above formulae, R is an alkyl radical having 3-18 carbon atoms, R' is selected from the group consisting of hydrogen, methyl and ethyl, and R'' is selected from the group consisting of hydrogen and methyl. However, when R' of the above formulae is ethyl, then R'' is hydrogen. As represented in the above formulae, X is a positive charged ion selected from the group consisting of an alkali metal ion such as a sodium or potassium ion, an ammonium ion or a substituted ammonium ion formed from amines such as mono-, di-, and tri-methyl-amines, mono-, di-, and tri-ethylamines, mono-, di-, and tri-propylamines; mono-, di-, and tri-ethanolamines, 2-methyl-2-amino-propanol-1, and mixtures of the above amines. It will be recognized that when certain reaction conditions are used in forming the alkyl ester of an olefin-maleic anhydride copolymer, no groups of Formula B would be present in the final product. In the practice of this embodiment, the preferred salt of an alkyl ester of an olefin-maleic anhydride copolymer is the sodium salt of the butyl ester of an ethylene-maleic anhydride copolymer.

In the practice of this invention, the molecular weight of the salt of an alkyl ester of the olefin-maleic anhydride copolymer is significant in its use as a dispersant for organic pigments in an aqueous medium. The salt of the copolymer of this invention should have a weight average molecular weight of up to about 10,000 and preferably 800-4000 and more particularly 1000-2500. In the preferred embodiment of this invention wherein the salt of the copolymer is the sodium salt of the butyl ester of an ethylene maleic anhydride copolymer, the recurring groups of Formulae A and B total 3-20 for the preferred weight average molecular weight of about 800-4000. Depending upon the structure of Formulae A and B and in particular where the salt of the copolymer consists of 100% of Formula A, the number of recurring groups thereof can total up to about 50. If the weight average molecular weight of the alkyl ester of the olefin-maleic anhydride copolymer of this invention as set forth in Formulae A and B is in excess of 10,000 the dispersing effect of the salt of the copolymer is no longer practicable and probably serves little use in dispersing organic pigments in an aqueous medium. Optimum dispersing action is generally achieved with the particular salt of the copolymer having a weight average molecular weight of 1000-2500.

The alkyl esters of an olefin-maleic anhydride copolymer employed in the practice of this invention may be prepared by slurrying an olefin-maleic anhydride copolymer in a quantity of alcohol in excess of a stoichiometrically equivalent portion thereof. The mixture is maintained at a temperature ranging from about 50° C. to about 220° C. for a period from about 2 minutes to about 90 minutes. However, it will be recognized that if a partial alkyl ester of an olefin-maleic anhydride copolymer is prepared, less than a stoichiometrically equivalent portion of an alcohol would be employed. To make up the balance of liquid necessary to form a slurry, an inert organic solvent should be used. As used herein, inert organic solvent means any organic solvent that is not reactive with a carboxylic anhydride or an alcohol and includes solvents selected from the class consisting of ketones, aromatics and esters. The product obtained therefrom is the acid form of the alkyl ester of an olefin-maleic anhydride copolymer. This product when converted to an ammonium, a substituted ammonium or an alkali metal salt thereof, is readily soluble in water. The tertiary alkyl ammonium salts thereof are also readily soluble in the organic media specified previously.

The olefin-maleic anhydride copolymer portion of an alkyl ester of an olefin-maleic anhydride copolymer as used in the practice of this invention may be either an ethylene-maleic anhydride, a propylene-maleic anhydride, a butylene-maleic anhydride or an isobutylene-maleic anhydride copolymer. The basic structure of these copolymers have recurring groups of the formula:

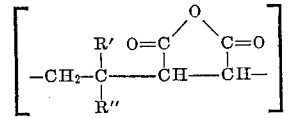

The alkyl ester portion of the alkyl esters of an olefin-maleic anhydride copolymer is derived from alkyl alcohols having an aliphatic moiety of 3-18 carbon atoms.

Typical examples of the alcohols that may be employed are propyl alcohol, butyl alcohol, octyl alcohol, and octadecyl alcohol.

The preparation of the aqueous dispersion of an organic pigment is carried out first by completely dissolving under agitation the dispersing agent in a portion of the aqueous medium. The organic pigment to be employed is then added under agitation, which may be accomplished by the use of a mechanical stirrer, ball-mill mixer, three-roll mixer or any of the other conventional mixers commonly employed in preparing pigment dispersions. The pigment solids can be adjusted to the desired concentration by addition of the remainder of the aqueous medium.

The advantages of this invention are found in the ability of the salt of the alkyl ester of an olefin-maleic anhydride copolymer to disperse organic pigments so as to provide unusually stable dispersions of the organic pigments. Typical examples of a few of the organic pigments which are readily dispersed are the Phthalocyanine Blues, Phthalocyanine Greens, Toluidine Reds, Hansa Yellow, B.O.N. Reds, Litho Reds and Para Reds. A few specific applications of the dispersions of this invention include textile printing paste systems such as oil-in-water, water-in-oil or straight oil, printing inks, predispersed organic pigment systems, dispersions of organic pigments in aqueous latex surface coating compositions and in "oil" base surface coating compositions, dispersions of organic pigments in organic aerosol formulations such as acrylate resin in a solvent solution, dispersions of insecticides, fungicides, and dispersions of rubber chemicals for the purpose of satisfactory compounding.

It will thus be seen that the objects set forth above among those made apparent from the preceding description are efficiently obtained, and since certain changes may be made in carrying out the above process and in the compositions set forth without departing from the scope of the invention, it is intended that all matter contained in the above description be interpreted as illustrative and not in a limiting sense.

What is claimed is:

1. In a process for preparing dispersions of water-insoluble organic pigments in an aqueous medium; the improvement which comprises incorporating in the aqueous medium a salt of an alkyl ester of an olefin-maleic anhydride copolymer in the amount of 0.1–7.0 weight percent based on the weight of the organic pigment dispersed therein; said salt of an alkyl ester of an olefin-maleic anhydride copolymer having a weight average molecular weight of up to about 10,000 and having in its structure recurring groups of the formulae:

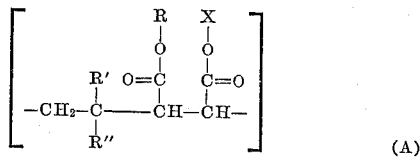

(A)

and

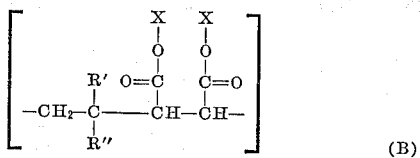

(B)

with the total number of groups (A) and (B) being 3–20 of which total (A) constitutes 50–100%; wherein R is an alkyl radical having 3–18 carbon atoms; R' is selected from the group consisting of hydrogen, methyl and ethyl, R" is selected from the group consisting of hydrogen and methyl, providing that when R' is ethyl, R" is hydrogen; and X is selected from the group consisting of ammonium, substituted ammonium and alkali metal ions.

2. A process as described in claim 1 wherein the weight average molecular weight of the salt of an alkyl ester of an olefin-maleic anhydride copolymer is 800–4000.

3. A process as described in claim 1 wherein the salt of an alkyl ester of an olefin-maleic anhydride copolymer is the salt of an alkyl ester of an ethylene-maleic anhydride copolymer.

4. A process as described in claim 1 wherein the salt of an alkyl ester of an olefin-maleic anhydride copolymer is the sodium salt of a butyl ester of an ethylene-maleic anhydride copolymer.

5. In an aqueous latex surface coating composition which comprises a water-insoluble organic pigment dispersed in an aqueous latex of a film-forming polymer; the improvement which comprises incorporating therein a salt of an alkyl ester of an olefin-maleic anhydride copolymer in the amount of 0.1–7.0 weight percent based on the weight of the organic pigment dispersed therein; said salt of an alkyl ester of an olefin-maleic anhydride copolymer having a weight average molecular weight of up to about 10,000 and having in its structure recurring groups of the formulae:

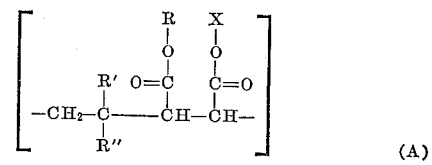

(A)

and

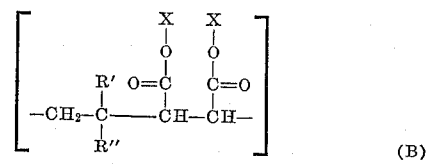

(B)

with the total number of groups (A) and (B) being 3–20 of which total (A) constitutes 50–100%; wherein R is an alkyl radical having 3–18 carbon atoms; R' is selected from the group consisting of hydrogen, methyl and ethyl; R" is selected from the group consisting of hydrogen and methyl, providing that when R' is ethyl, R" is hydrogen; and X is selected from the group consisting of ammonium, substituted ammonium and alkali metal ions.

6. An aqueous latex surface coating composition as described in claim 1 wherein the salt of an alkyl ester of an olefin-maleic anhydride copolymer is the sodium salt of the butyl ester of an ethylene-maleic anhydride copolymer.

References Cited

UNITED STATES PATENTS 2,977,334   3/1961   Zopf et al. _____ 260—78.5
3,000,840   9/1961   Johnson et al. _____ 260—29.6

WILLIAM H. SHORT, *Primary Examiner.*

L. P. QUAST, J. NORRIS, *Assistant Examiners.*